Figure 1:
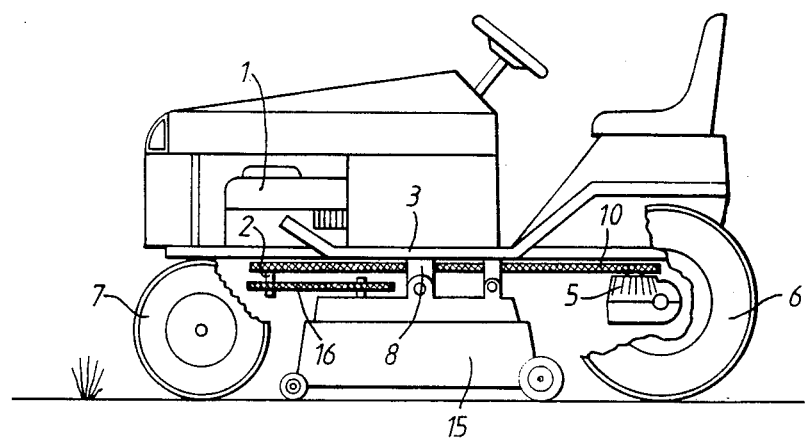

United States Patent [19]

Thoma et al.

[11] Patent Number: 4,979,583
[45] Date of Patent: Dec. 25, 1990

[54] VARIABLE SPEED TRANSAXLE

[76] Inventors: Christian H. Thoma, Chalet Abaco, Green Road, St. Clement, Jersey; George D. M. Arnold, Balmain House, Undercliffe Road, St. Helier, Jersey, both of Great Britain

[21] Appl. No.: 222,513

[22] Filed: Jul. 1, 1988

[30] Foreign Application Priority Data

| Jul. 4, 1987 | [GB] | United Kingdom | 8715789 |
| Aug. 3, 1987 | [GB] | United Kingdom | 8718352 |
| Dec. 9, 1987 | [GB] | United Kingdom | 8728828 |
| Feb. 23, 1988 | [GB] | United Kingdom | 8804087 |
| Mar. 24, 1988 | [GB] | United Kingdom | 8806995 |

[51] Int. Cl.$^5$ .............................................. B60K 7/00
[52] U.S. Cl. ..................................... 180/62; 180/305; 180/344
[58] Field of Search ................. 180/305, 75, 905, 307, 180/62, 63, 53.4; 60/530, 325; 74/730, 606 R, 720

[56] References Cited

U.S. PATENT DOCUMENTS

| 1,266,606 | 5/1918 | Manly | 60/437 |
| 3,131,580 | 5/1964 | Forster | 74/720 |
| 3,279,172 | 10/1966 | Kudo et al. | 60/53 |
| 3,385,058 | 5/1968 | Root et al. | 60/53 |
| 3,424,032 | 1/1969 | Ritter | 74/730 |
| 3,464,205 | 9/1969 | Henry-Biabaud | 60/53 |
| 3,687,212 | 8/1972 | Forster | 180/53.4 |
| 3,748,851 | 7/1973 | Hause | 60/19 |
| 3,750,533 | 8/1973 | Thoma | 91/498 |
| 3,751,924 | 8/1973 | Brown et al. | 60/485 |
| 4,147,075 | 4/1979 | Rasman et al. | 74/720 |
| 4,480,501 | 11/1984 | von Kaler | 475/230 |
| 4,686,829 | 8/1987 | Thoma et al. | 60/464 |
| 4,691,512 | 9/1987 | Thoma et al. | 60/456 |
| 4,696,164 | 9/1987 | Giere | 60/485 |
| 4,856,368 | 8/1989 | Fujisaki et al. | 74/606 R |

FOREIGN PATENT DOCUMENTS 1281094 7/1972 United Kingdom .

OTHER PUBLICATIONS

"Models 750/850 Hydrostatic Transaxles", Eaton Product Information, one page.
"Series 2600 Transaxles", Tecumseh Product Information, one page.
"U.S. Advances in Tracked Armoured Vehicle Transmissions", *International Defense Review*, Mar. 1978, pp. 396–400.
"Characteristics—Transmission, Crossdrive XM1", General Electric Product Information.
"Anordnungen Hydrostatischer Getriebe in Fahrzeugantrieben", *ATZ Automobiltechnische Zeitschrift*, No. 1, Jan. 1968, pp. 6–9, by H. Stuhr.
"Light Duty Family of Transmissions", Eaton Product Information, p. 2.
"Peerless Series 2500, 1300, 1310 'Hydrostatic' 2-Speed Gear Reduction and Differential", *Tecumseh Products Company*, Production Information, two pages.
"Kanzaki Transaxle Model K100, K200", Kanzaki Product Information, one page.

*Primary Examiner*—Charles A. Marmor
*Assistant Examiner*—Richard Camby
*Attorney, Agent, or Firm*—Young & Thompson

[57] ABSTRACT

A rotary hydraulic piston transmission located within an axle housing is provided that includes reduction gearing and a mechanical differential for the purpose of compactness and simplicity of manufacture. The axle housing comprises two main elements which, when attached together, form internal cavities, one cavity expressly used for the hydraulic transmission which comprises a hydraulic pump and a hydraulic motor mounted on either side of a partition member, and where the partition member divides the cavity into an upper and lower chamber for location of the hydraulic pump and hydraulic motor, respectively. The remaining cavities contain the reduction gearing and mechanical differential, and where the cavity containing the hydraulic transmission is purposely segregated from the remaining cavities in order to prevent material worn from the gears from entering the oil chambers of the hydraulic transmission.

66 Claims, 11 Drawing Sheets

VARIABLE SPEED TRANSAXLE

This invention relates to axles and in particular but not exclusively to an improved Lawn tractor axle built with two segregated internal chambers, one in which houses the gear and differential assembly, the other housing to the hydrostatic transmission, and in particular a hydrostatic transmission of the type where both pump and motor are mounted back to back either side of a central plate.

Existing hydrostatic transmissions of the back to back type currently fitted to such vehicles require a separate axle containing the necessary reduction gearing and differential. Such hydrostatic transmissions are obtained as self contained units including their own end housings, and where the hydrostatic transmission is attached to an external face of the axle by bolts.

The prohibiting factor which at present prevents such hydrostatic machines gaining a larger market share in such vehicles, is that the combined cost of the hydrostatic transmission and the axle amounts to over double the price when compared to a conventional mechanical shift transmission.

A further disadvantage of all current hydrostatic transmission is that the combined height dimension when the hydrostatic transmission is mounted onto the axle is too great to allow for its application to the mass produced lower horsepower tractors where the vertical engine shaft and drive wheels of 18 inches diameter or less, are becoming by far the most common vehicle configuration. This is due to the limited space available between the ground and the underside of the tractor chassis, and therefore the height dimension of the axle is of critical importance.

As it is these lower horsepower tractors which are produced in far larger number then the higher horsepower tractors, a unconventional approach is required to satisfy both cost and dimensional requirements if a new hydrostatic transmission is to make a breakthrough in this market area, and it is therefore the aim of the invention to provide solutions which will largely overcome these existing problems.

Thus one object of the invention is to provide an axle into which a hydrostatic transmission can be assembled as one component part, without regarding the usual and expensive two end housings of the hydrostatic transmission.

The invention, in one form thereof, relates to a hydrostatic transmission including a radial piston pump coupled to a radial piston hydrostatic motor, the pump and motor each comprising a rotary cylinder barrel provided generally radial cylinders which accommodate pistons co-operating with a surrounding annular cam track, both cylinder barrels being mounted on a common fixed pintle provided with internal fluid flow and return passages which form a closed hydraulic circuit. Preferably the pintle is provided with check valves communicating with the machine chamber and arranged to open automatically to admit make-up fluid to the circuit. The pintle is fixedly and non-rotatably mounted in a sandwich plate which acts as a partitioning wall between the pump and motor. Transmission means are provided for coupling the rotary cylinder barrel members to their respective drive shafts, one or preferably both drive shafts being supported and positioned in the main axle housings.

The hydrostatic transmission is totally incapsulated inside an inbetween the two main axle housings elements. The two main axle housing when bolted together lock and locate both the hydrostatic transmission as well as the gear reduction and differential assembly. The two main chambers inside the axle containing the hydrostatic transmission and the gearing are purposely segregated so avoiding metal material worn away from the gears from finding its way into the closed oil circuit of the hydrostatic transmission.

According to the preferred embodiment of the invention the central sandwich plate of the hydrostatic transmission is intentionally wedged into a locked position between the two housings of the axle, and where the mating faces of the axle housing elements are on a plane generally containing the longitudinal axis of the axle.

According to the invention in another aspect, the sandwich plate/pintle assembly and rotary cylinder elements of the hydrostatic transmission are mounted onto a dished member which is then intentionally wedged into a locked position between the two main axle housings.

According to the invention in another aspect, the sandwich plate/pintle assembly and rotary cylinder elements of the hydrostatic transmission are mounted into a recess formed into one of the axle housings, and where a separate domed member is attached over the recess to lock and locate the elements of the hydrostatic transmission in place.

According to the invention in another aspect, the axle comprises two main housings where the plane of the mating face is generally transverse to the longitudinal axis of the axle, and where the rotary cylinder elements guided on the pintle valve are positioned either side of a portion wall which forms part of the axle housing.

According to one preferred feature of the invention, the axle containing the hydrostatic transmission is preferably mounted to the underside of the vehicle chassis so that the drive shafts of the hydrostatic transmission are in alinement with the engine shaft of the vehicle.

According to another preferred feature of the invention the axle can be installed in both the vertical and horizontal plane, thereby allowing application to both inline horizontal and vertical crankshaft engined vehicles.

Figure 2:
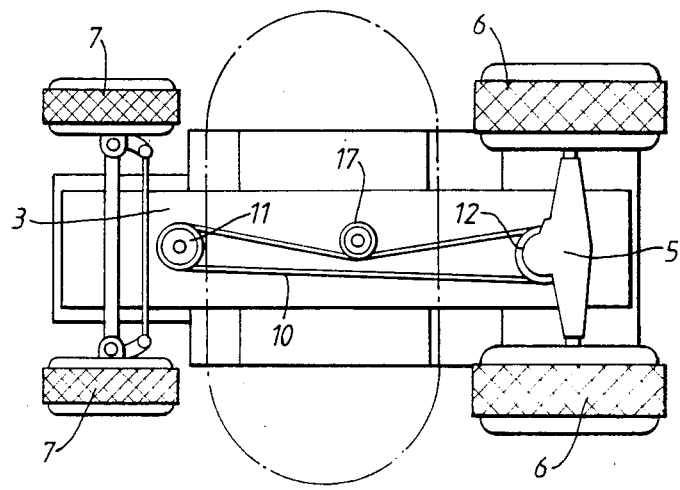
Figure 3:
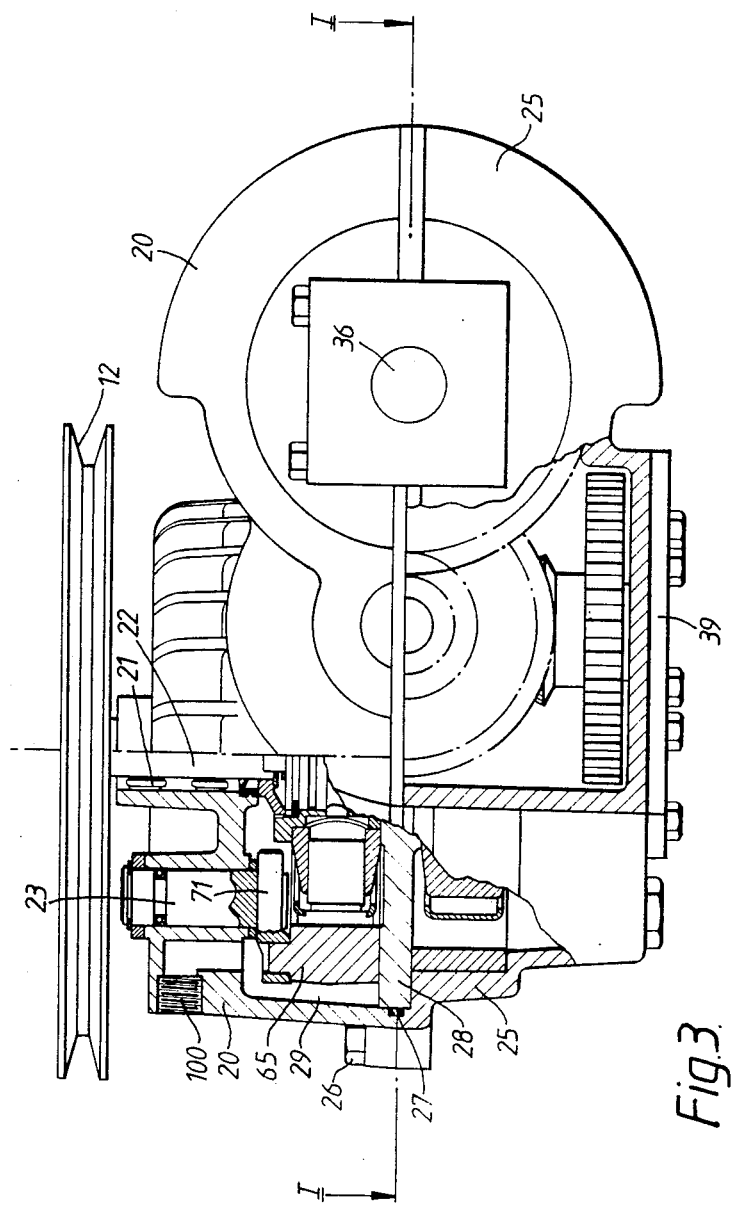
Figure 4:
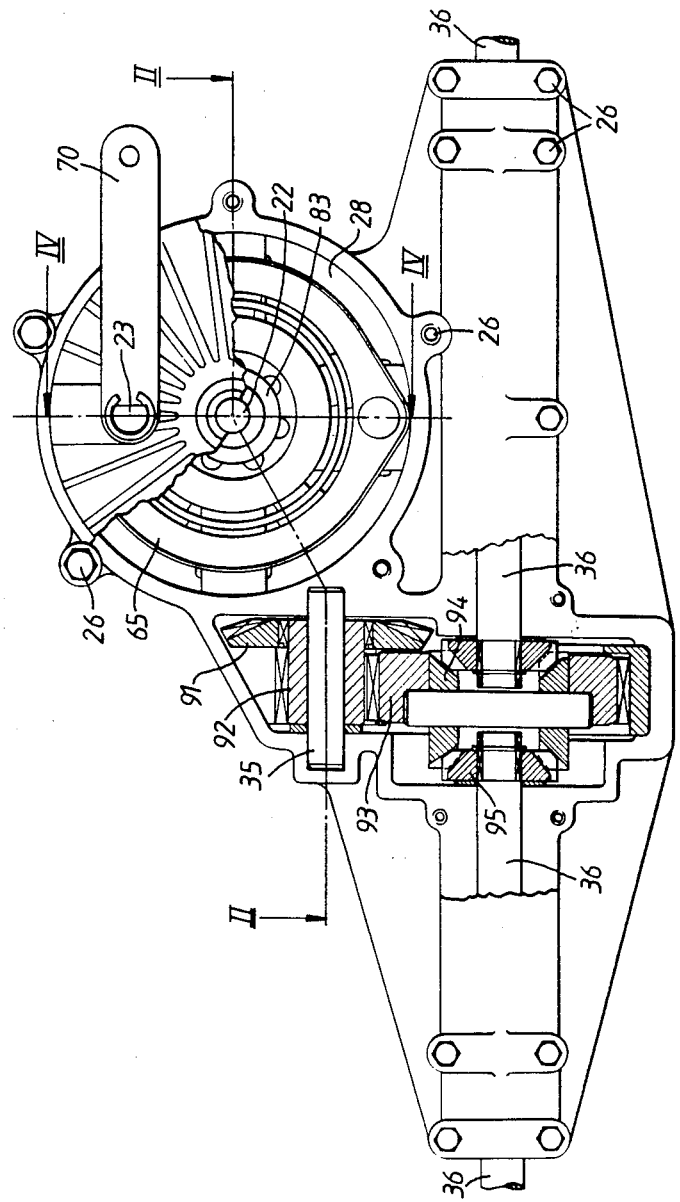
Figure 5:
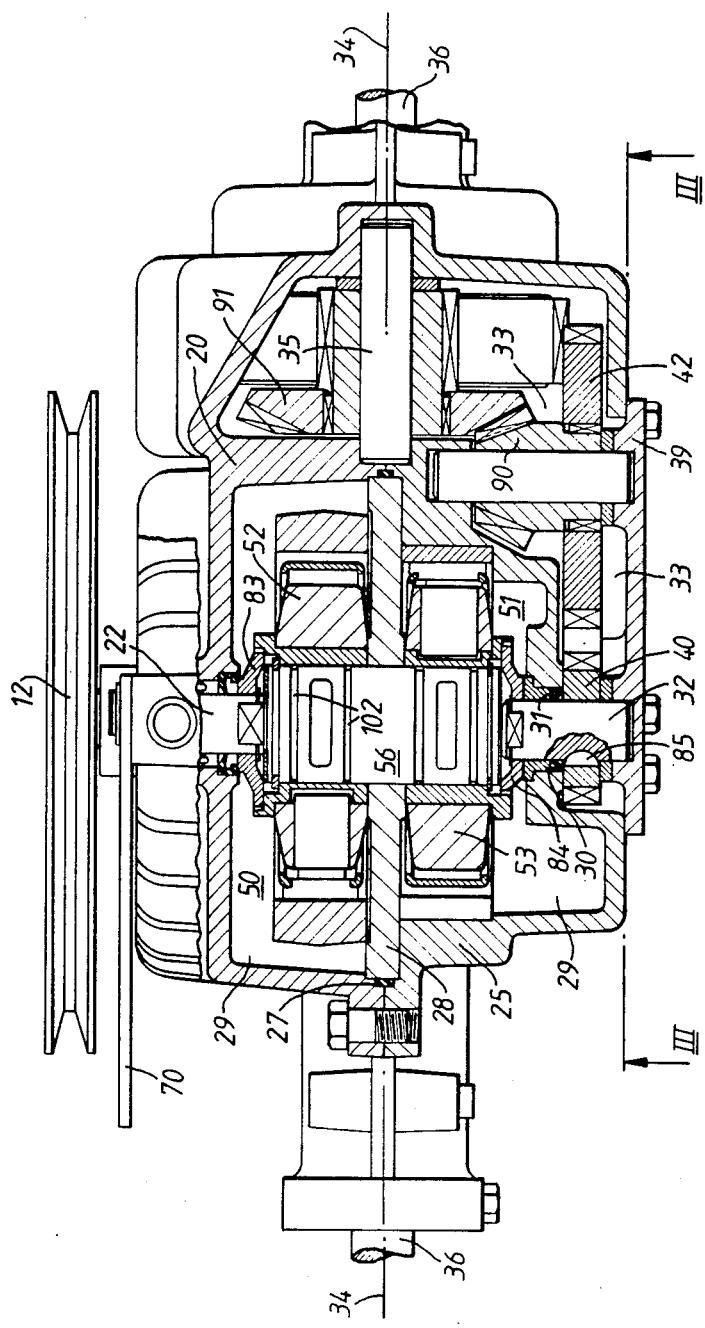
Figure 6:
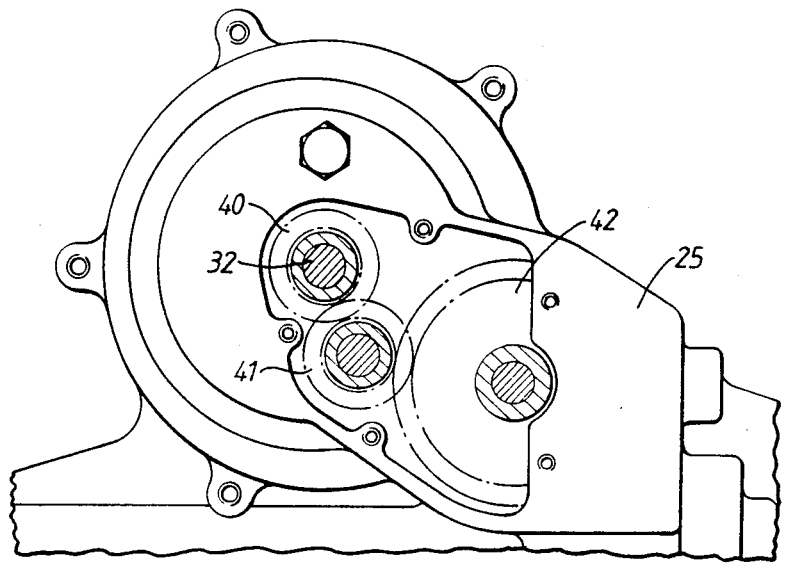
Figure 7:
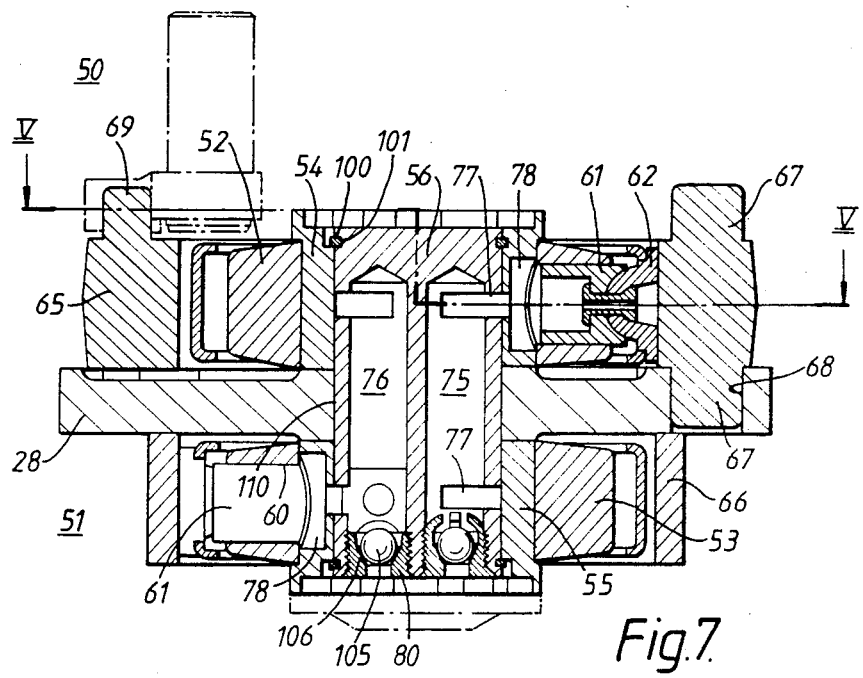
Figure 8:
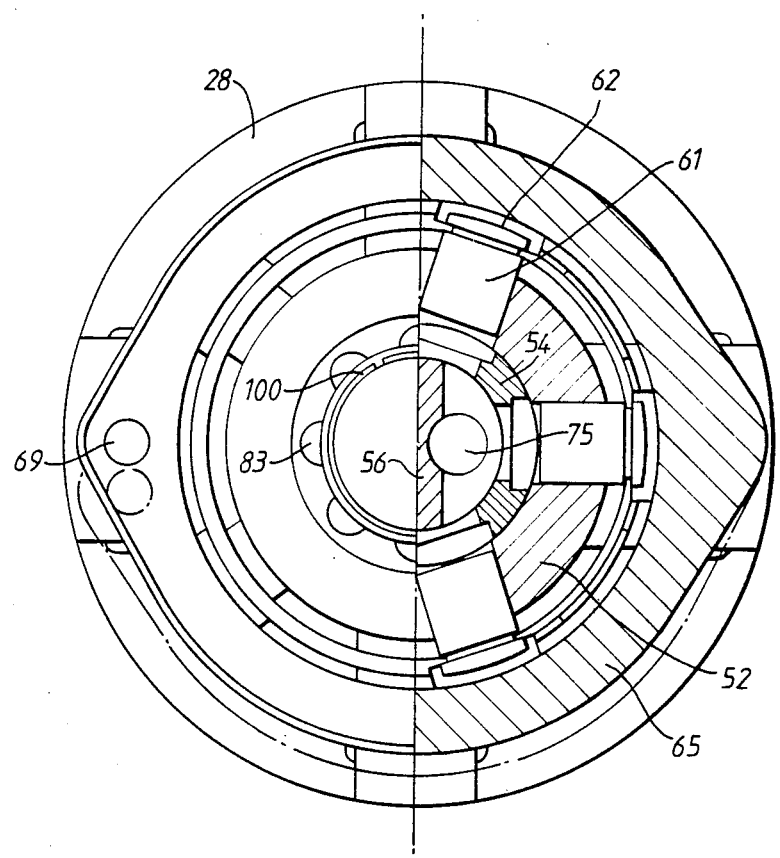
Figure 9:
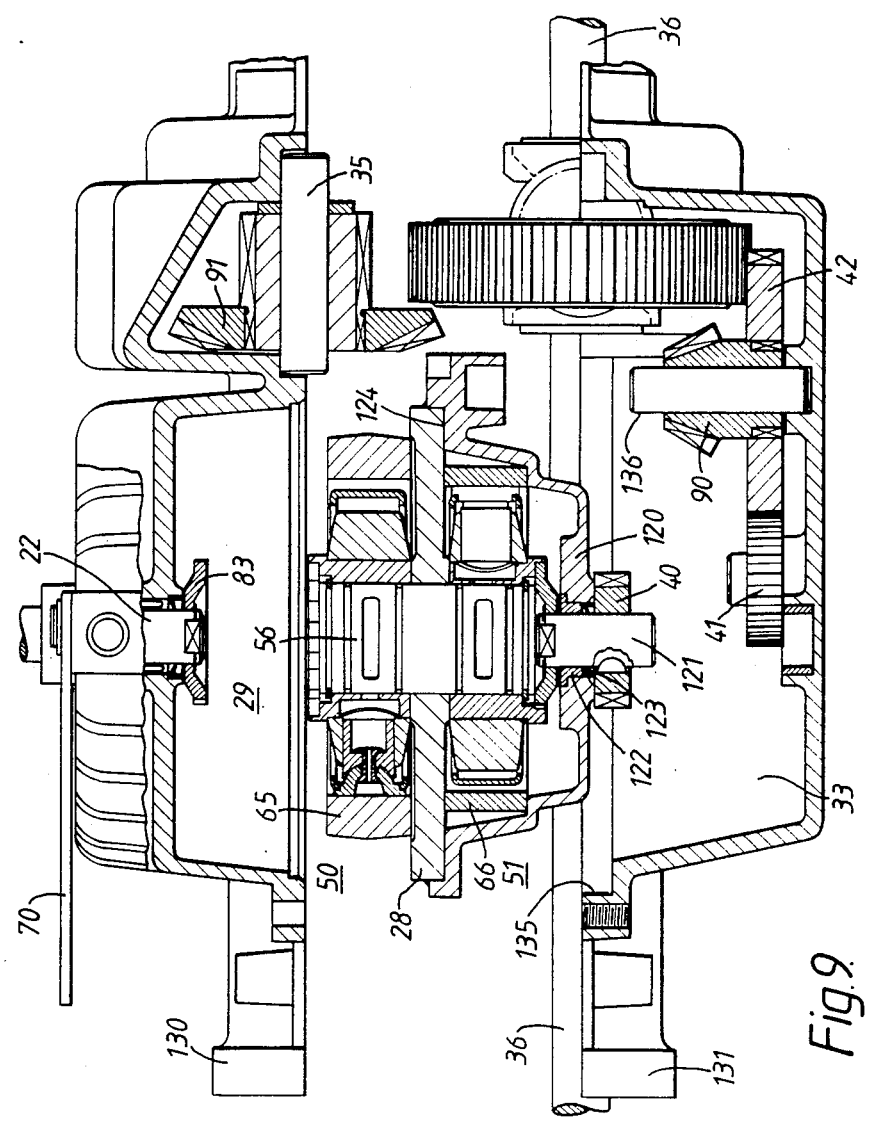
Figure 10:
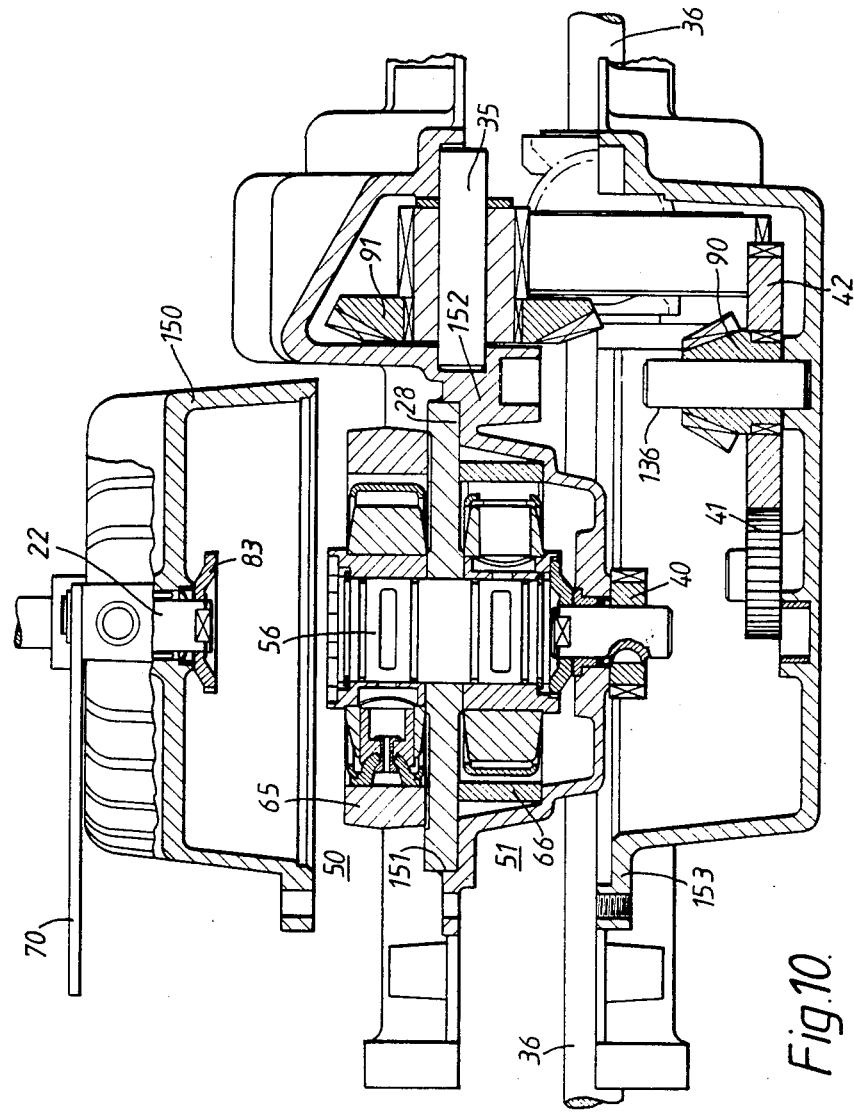
Figure 11:
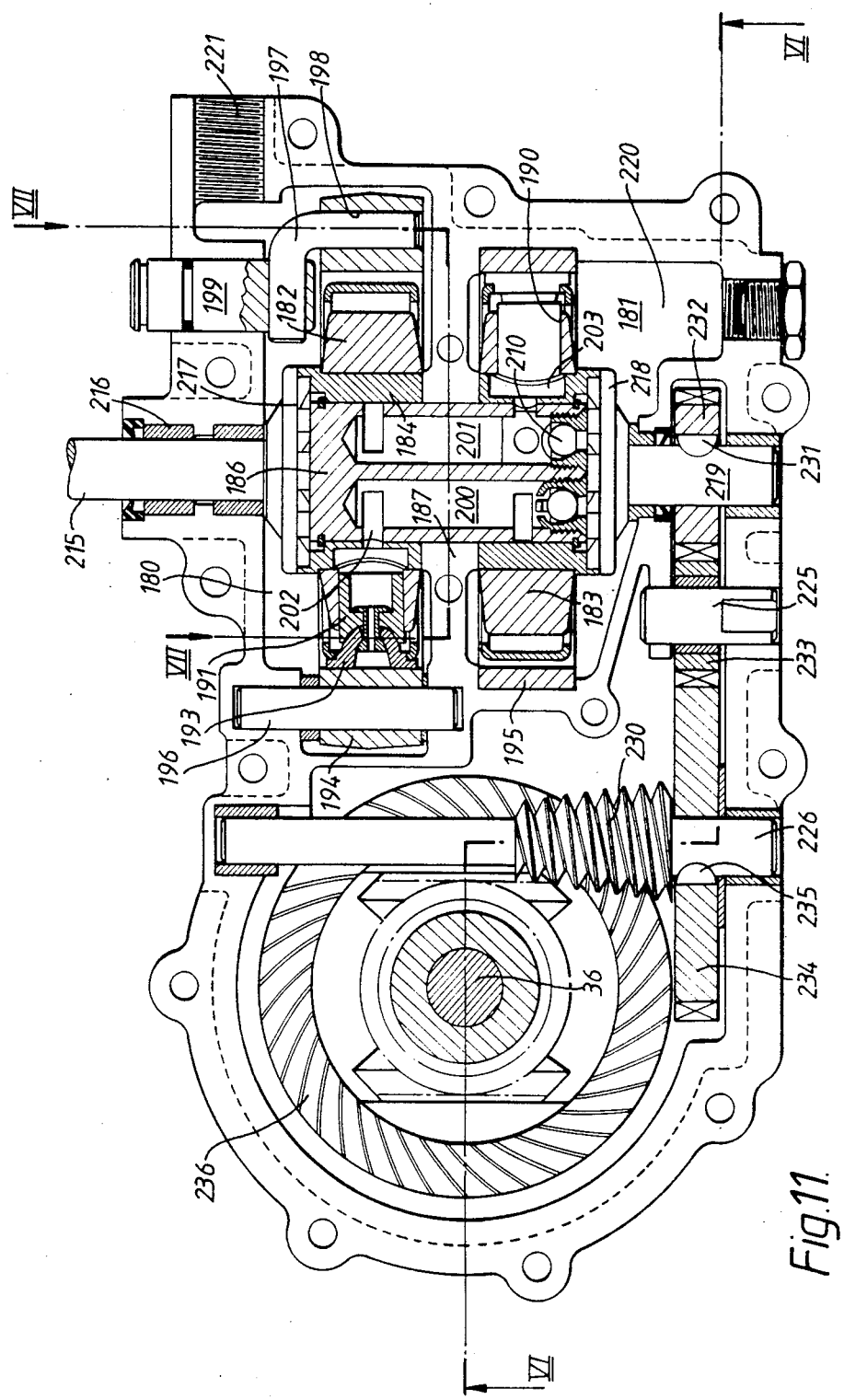
Figure 12:
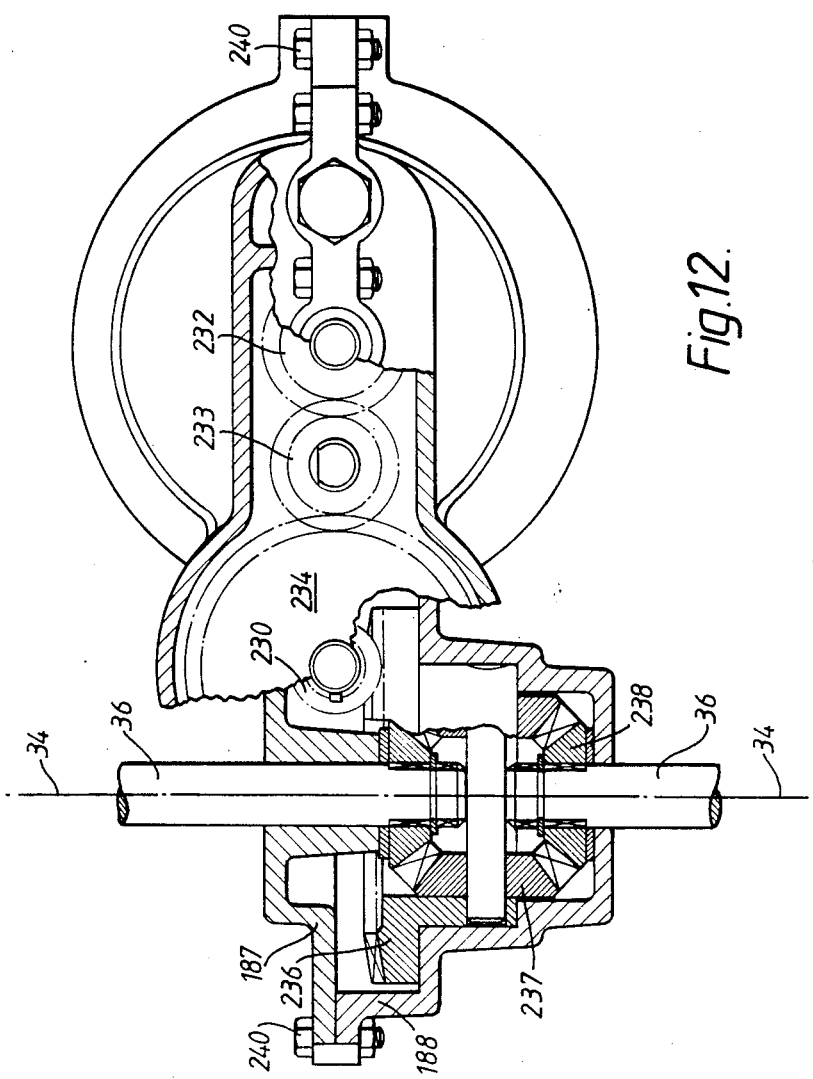
Figure 13:
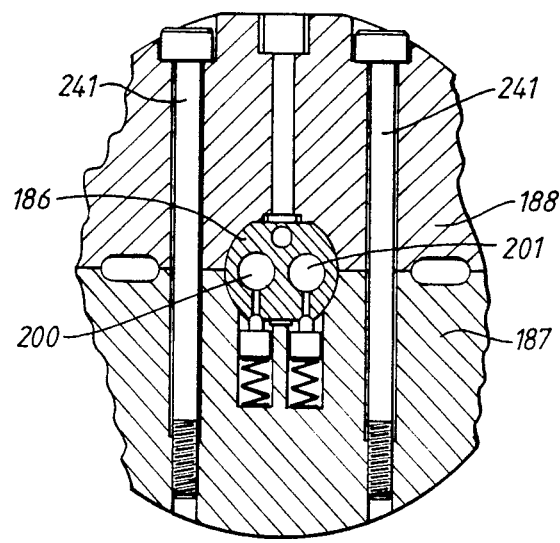

The invention may be performed in various ways and will now be described by way of example with reference to the accompanying drawings, in which:

FIG. 1 is a side view of a typical grass cutting lawn or garden tractor vehicle, FIG. 2 is an underneath view of the vehicle in FIG. 1, FIG. 3 is a side view of the axle according to the invention, viewed from the position of the drive wheel, with partial cross-section through the elements of the hydrostatic transmission, FIG. 4 is a sectional plan view downwards of an axle on line I—I on FIG. 3, FIG. 5 is a frontal view of the axle, with partial cross-sectional through the drive shaft axis line II—II on FIG. 4, FIG. 6 is a partial view of the underside of the axle on line III—III on FIG. 5, FIG. 7 is a plan view in partial section of the hydrostatic transmission according to the invention on line IV—IV on FIG. 4, FIG. 8 is a sectional side elevation of the hydrostatic transmission viewed on line V—V on FIG. 7, FIG. 9 is a sectional frontal view illustrating a modified form of axle prior to the assembly of the two main housing elements around the hydrostatic transmission, FIG. 10 is a sectional frontal view illustrating a further modified form of axle with the hydrostatic transmission located into a recess in one of the main housing elements prior to assembly between the other main housing element and a domed member, FIG. 11 is a sectional side elevation of an axle with internal hydrostatic transmission illustrating a further possible modification, FIG. 12 is a sectional plan view through the axle on the line VI—VI in FIG. 11, FIG. 13 is a partial view of the pintle clamping means on line VII—VII in FIG. 11.

Almost all manufacturers of light duty lawn tractor grass mowers prefer to install vertical crankshaft internal combustion engines to such vehicles, thereby enabling them to fit simple belt drives from the engine to the mower deck and transmission.

The engine can be mounted on the chassis of the vehicle either over the front or the rear wheels, whereas the transmission is almost always mounted in a position close to or directly over the rear drive wheels.

This installation allows for a simple Vee belt operating in the horizontal plane to transfer engine power from the engine pulley to a drive pulley keyed to the input shaft of the axle.

The tractor vehicle illustrated in FIGS. 1 and 2 comprises a vertically installed internal combustion engine 1 with the crank shaft 2 pointing down to the ground. The engine 1 is shown mounted at the front end of the tractor chassis 3 and the axle 5 containing the internal hydrostatic transmission is mounted towards the rear of the tractor chassis 3 and connected to the rear drive wheels 6. A simple V belt 10 operating in the horizontal plane connects the engine pulley 11 with the input drive pulley 12 of the axle 5, with a simple jockey pulley 17 acting as tensioning means for the V belt as shown in FIG. 2.

In FIG. 1, a grass mower deck 15 is shown located beneath the vehicle chassis 3 in a position between the rear two drive wheels 6 and the front two steering wheels 7 of the tractor. The mower deck 15 is attached to the tractor chassis 3 by way of height-adjusting supports 8 and is driven from the engine 1 by means of a short Vee belt 16.

Up to now very few hydrostatic transmissions have been installed in such vehicles due to the higher cost price of such transmissions over standard mechanical shift gearbox transmissions. Therefore in order to reduce the cost of manufacture and thereby increase the number of hydrostatic transmissions used in such applications, it becomes necessary to simplify the construction by using fewer component parts, and according to at least one embodiment of the invention this can now be done by incorporating the hydrostatic transmission inside the axle such that the two end housings normally fitted to all existing hydrostatic transmissions of this general type now become obsolete, and where preferably the two halves of the axle form the required end housings of the said hydrostatic transmission.

The upper axle housing 20 as shown in FIG. 3 contains the necessary bearing support 21 for the axle pulley 12 and drive shaft 22, and positions the hydrostatic transmission speed varying control shaft 23.

The upper axle housing 20 abuts directly against the lower axle housing 25, and the two halves forming the complete axle are tightened together by a number of screws 26 as shown in FIG. 4.

As the screws are tightened, the 'O' ring type seal 27 placed between the sandwich plate 28 and the two axle housings 20,25 is compressed thereby preventing hydraulic oil from seeping out of the internal cavity 29 containing the hydrostatic assembly.

The lower axle housing 25 shown in more detail in FIG. 5, has provision for both a bearing support 30 and oil seal 31 for the drive shaft 32. Oil seal 31 prevents hydraulic fluid from seeping into the neighbouring gear cavity 33.

The axle is preferably split horizontally along the drive wheel axis 34 so that when the two axle housings 20,25 are located together, they each provide half the required bearing support for the bevel spigot shaft 35 and axle shafts 36.

FIG. 6 illustrates a partial underneath view of the axle housing 25 disclosing gear train 40,41,42. In this case the inspection cover 39 as shown in FIG. 5, has been withdrawn.

The pump 50 and motor 51 elements of the hydrostatic transmission are of generally similar construction as shown in FIGS. 7 and 8. Each comprises a rotary cylinder barrel 52,53 respectively attached to a ported sleeve 54,55 mounted to rotate at each end of a common fixed pintle valve 56. The pintle 56 is rigidly secured in a central sandwich plate 28 acting as a internal partition between pump 50 and motor 51. Each of the cylinder barrels 52,53 are formed with a number of radial bores 60 each containing a piston 61 attached to a slipper 62, that act against a surrounding annular track ring 65,66. The motor track ring 66 remains permanently attached to the sandwich plate 28 at an eccentric position in relation to the central axis of the pintle valve 56. The pump 50 track ring 65 preferably has spigots 67, one of which is engaged in bore 68 in the sandwich plate 28 and is allowed to pivot in bore 68. A smaller spigot 69 also preferably formed as part of the track ring 65, is connected to the external transmission ratio control lever 70 via pin 71 and control shaft 23 as shown in FIGS. 3 and 4.

When the control shaft 23 is turned by the action of the tractor driver moving the transmission ratio control lever 70, the eccentricity of the track ring 65 is altered in relation to the centre of the fixed pintle valve 56, and thus the volumetric oil flow output of the pump 50 and hence the vehicle speed is altered.

The fixed pintle 56 may have two or more internal longitudinal passages shown as 75,76 each opening at opposite ends into arcuate ports 77 which communicate with respective cylinder bores 78 as the cylinder members 52,53 rotate. At the lower end of the pintle 56 there are preferably located two or more ball check valves 80 which allow additional fluid to be drawn into the oil circuit passages 75,76 from the internal oil chamber 29, for purposes of replacing any fluid loss from the main transmission oil circuit during operation.

With reference to FIGS. 1 to 5, mechanical power transmitted by the Vee belt 10 to the axle pulley 12 and input drive shaft 22 is directed to the rotary cylinder barrel 52 of the pump 50 by means of a coupling 83 such as the well known oldham type.

In the motor 51, an identical type coupling 84 connects the rotary cylinder barrel 53 to drive shaft 32 which is keyed 85 to spur gear 40 which forms part of the first stage of the axle gear reduction. Gear 40 meshes with gear 41 shown in FIG. 6, and through gear 42 and bevel pinion 90 to gear 91. In the illustration shown as FIG. 4, bevel gear 91 is attached to gear 92 supported on spigot shaft 35, and thereby is connected with the axle differential gear 93, and internal gearing 94,95 to the axle shafts 36 (FIG. 4).

If the hydrostatic transmission chamber 29 is completely full of oil, a remote oil expansion tank (not shown) may be required, this being connected to the axle housing 20 at the external port shown as 100 in FIG. 3. However it is preferable to provide sufficient space at the top of chamber 29 to allow for oil expansion, thereby avoiding any necessity to fit a remote oil tank.

By appropriate selection or adjustment of the eccentricity of track ring 65, the transmission ratio is adjusted. For instance, for forward motion of the vehicle, rotation of the input drive shaft 22 by means of transmitted power from the engine 1 through the V belt 10, produced rotation of the pump 50 rotary cylinder barrel 52 and consequent radial reciprocating movement of the pistons 61, causing fluid to flow out from the cylinder bore 78, through port 77 and along passage 75. The action of the incoming oil into the motor 51 causes the motor 51 pistons 61 to reciprocate as the annular track ring 66 is eccentrically positioned relative to the centre of the pintle 56, and through the angular action of the piston 61 and slipper 62 against the track ring 66, rotation of the cylinder barrel member 53 is produced which in turn rotates shaft 32 via coupling 84.

With the motor 51 shaft 32 now rotating, mechanical power is transmitted through spur gears 40,41,42 to bevel pinion 90 and gear 91. Bevel gearing 90,91 turns the drive axis through ninety degrees so that it is now in line with the longitudinal axis 34 of the axle.

Gear 92 supported but not fixed on spigot shaft 35, now drives gear 93 which forms part of a conventional differential assembly, of which differential gears 94,95 drive to the main axle shafts 36 and the rear drive wheels 6 of the tractor.

To allow quick and simple assembly of the hydrostatic transmission into the axle, it is recommended that the rotary cylinder barrel members 52,53 are retained on the pintle valve 56 so as to prevent them from slipping off the ends of the pintle 56.

This can be easily achieved with the use of two discontinuous rings 100 as shown in FIGS. 7 and 8. Each ring 100 is inserted into a groove 101 located at the ends of the pintle 56 after the rotary cylinder barrel members 52,53 have been positioned into place. This operation is inexpensive as four grooves are already necessary on the pintle valve surface as these govern the oil pressure spread on the said pintle valve as will be well known to those familiar with the art. The four pressure limiting grooves 102 are shown in the pintle 56 in FIG. 5.

Therefore, it is possible to machine a relatively deep groove 101 into the outer land at each end of the pintle valve 56 without weakening the mechanical strength of the pintle 56, as the piston force does not act at this point, but rather over the port 77 area on the pintle 56.

In its simplest form, the discontinuous ring 100 should exhibit some degree of resilience allowing it to expand when pushed over the end of the pintle 56, until it drops into the groove 101. Once the discontinuous ring 100 is secured in the groove 101 it should be proud of the pintle 56 surface, or in other words its diameter when measured will be greater than the pintle diameter.

Once the ring 100 is located in position, the rotary cylinder barrel member 52 cannot slide off the end of the pintle 56 and therefore will remain in the desired position for as long as the ring 100 is engaged in the groove 101.

Positioning the check valves 80 at the end of the pintle 56 rather than in the sandwich plate 28, helps reduce the required thickness of the sandwich plate 28 so that the overall height of the internal components can be kept as short as possible.

A further advantage of mounting the check valves 80 at one end of the pintle 56, and in particular the lower end of the pintle 56, is that the action of gravity will always tend to help retain the ball 105 against its seat 106 such that the check valve 80 remains closed. As a result, the check valve 80 will only open when the suction pressure in the oil passage 76 behind the ball 105 acts to lift the ball 105 off its seat 106.

This has an advantage over prior art hydrostatic transmissions where check valves mounted inside the sandwich plate in a horizontal plane are not under the influence of gravity to effect a seal on the seat.

By locating the hydrostatic transmission inside the axle it is now possible to reduce the overall height of the axle to a degree which will match that height currently obtainable with mechanical-shift transmissions.

This has not been possible in the past, as the mounting of a separate hydrostatic transmission onto an axle for vertical shaft installations would add several inches of height, and as a result the overall height of the complete axle assembly would be greater than that currently obtainable from existing mechanical gear shift transmissions.

By following the main principles of the invention, it is now possible to provide the tractor manufacturer with a hydrostatic axle package which allows him to reduce his inventory of parts. For instance, the dimensions of various components such as the tractor chassis and size of wheels can now be identical for both mechanical-shift and hydrostatic automatic models, thereby providing more cost effective and profitable manufacture.

FIG. 9 illustrates an alternative arrangement for the axle where the main housing elements 130, 131 are shown prior to being assembled together. The hydrostatic transmission is located between the two main housing elements 130, 131. The hydrostatic transmission comprising pump 50 and motor 51 mounted either side of a central sandwich plate 28 identical to that already described in FIGS. 3 to 8, and here positioned onto the upper face 124 of die-cast or pressed steel dish member 120.

The dish member 120 supports drive shaft 121 on bearing 122 and includes an oil seal 123.

For assembly, the dish member 120 holding the hydrostatic transmission is engaged to housing element 131 on the recess diameter shown as 135 and the shaft spigot 136. Once in position, housing element 130 is lowered onto its opposing housing element 131 to encapsulate the hydrostatic transmission.

Dish member 120 acts as the partitioning means for segregating the transmission oil chamber 29 from the gear chamber 33. In this alternative axle arrangement, no pressed steel inspection cover is required as in the earlier example shown as 39 in FIG. 5. In this case, gears 40, 41, and 42 can be assembled in place before the dish member 120 is placed in position into the lower axle housing element 131.

FIG. 10 illustrates a further alternative arrangement whereby a completely separate domed member 150 is used to encapsulate the hydrostatic transmission inside the axle.

In this illustration, a hydrostatic transmission comprising pump 50 and motor 51 positioned either side of the sandwich plate 28, is shown positioned into a recess 151 formed in axle housing element 152. This housing element 152 is then lowered onto its opposing housing element 153, and finally a domed element 150 containing both the drive shaft 22 and coupling 83 is placed on top of the upper housing element 152 to perform encapsulation of the hydrostatic transmission.

This arrangement has the same advantage to that disclosed in FIG. 9, in that the inspection cover shown as 39 in FIG. 5 is no longer necessary.

FIG. 11 to 13 disclose a further arrangement of an axle including an internal hydrostatic transmission where in this case, the housing elements are separable at a plane transverse to the longitudinal axis of the axle.

The pump 180 and motor 181 elements of the hydrostatic transmission are of generally similar construction as shown and described in FIGS. 7 and 8. Each comprises a rotary cylinder barrel 182,183 respectively attached to a ported sleeve 184 mounted to rotate on a common fixed pintle valve 186. However in this arrangement, the pintle 186 is rigidly held between the two axle housings 187,188, said axle housings 187,188 acting as a internal partition between pump 180 and motor 181.

Each of the cylinder barrels 182,183 are formed with a number of radial bores 190 each containing a piston 191 attached to a slipper 193, that act against a surrounding annular cam tracks 194,195. The pump 180 track cam 194 is pivotally mounted on a transverse pivot pin 196, and where a moveable hinge pin 197 locates into hole 198, said hinge pin 197 connecting via control shaft 199 to the external manual transmission ratio control lever.

When the control shaft 199 is turned by the action of the tractor driver moving the transmission ratio control lever, the eccentricity of the annular cam track 194 is altered in relation to the centre of the fixed pintle valve 186, and thus the volumetric oil flow output of the pump 180 and hence the vehicle speed is altered.

The fixed pintle 186 may have two or more internal longitudinal passages shown as 200,201 each opening at opposite ends into an arcuated port 202 which communicates with respective cylinder bores 203 as the cylinder members 182,183 rotate. At the lower end of the pintle 186 there are preferably located two or more check valves 210 which allow additional fluid to be drawn into the oil circuit passages 200,201 for purposes of replacing any fluid loss from the main transmission oil circuit during operation.

The input drive shaft 215 supported in bearings 216 is connected to the rotary cylinder barrel 182 of the pump 180 by means of a coupling 217 such as the well known oldham type.

For the motor 181, an identical coupling 218 connects the rotary cylinder barrel 183 to the output drive shaft 219. The hydrostatic transmission oil chamber 220 is full of oil and a remote oil expansion tank may be connected to the axle housing at the external port shown as 221.

In this arrangement, both housings 187,188 of the axle when assembled together act to support a substantial number of the internal components. For instance, drive shafts 215, 219, the pintle valve 186, control shaft 199, spigot shaft 225 and shaft 226 of the spiroid pinion gear 230.

The main advantage of this axle arrangement over those already disclosed, is that a separate sandwich plate such as 28 in FIG. 7, is no longer required.

As the two housings 187,188 of the axle are tightened together by means of short screws 240 and socket head cap screws 241 shown in FIG. 13, the pintle 186 is held and firmly locked in place.

In operation, mechanical power transmitted by the Vee belt 10 to the axle pulley 12 as shown in FIG. 1 and 2 rotates the input drive shaft 215, and through oldham coupling 217 to the rotary cylinder barrel member 182 of the pump 180.

By appropriate selection or adjustment of the eccentricity of annular cam track 194 from its neutral or central position, the pump 180 pistons 191 begin to reciprocate in their respective bores 190 through the angular action of the piston 191 and slipper 193 acting on the eccentrically positioned annular cam track 194, producing oil flow from pump 180 to motor 181 by way of ports 202 and oil passage 200.

The action of the incoming oil into the motor 181 causes the motor 181 pistons 191 to reciprocate as the annular cam track 195 is eccentrically positioned relative to the centre of the pintle 186, and through the angular action of the piston 191 and slipper 193 against the track ring 195, rotation of the cylinder barrel member 183 is produced which in turn rotates shaft 219 via coupling 218.

Mechanical power from rotating shaft 219 keyed 231 to spur gear 232 is transferred through neighbouring gears 233,234, to the spiroid pinion 230 which is keyed 235 with gear 234 on shaft 226.

Spiroid pinion 230 engaging gear 236 turns the drive axis through ninety degrees and hence in line with the wheel axis 34, and where gear 236 forms part of a conventional differential assembly of which differential gears 237,238 drive the main axle shafts 36 and the rear drive wheels 6 of the tractor.

What is claimed is:

1. An axle assembly comprising a housing for an internally disposed hydrostatic transmission and forming an integral part of said hydrostatic transmission; axle shafts rotatably supported in said housing; said housing being defined by at least two separable elements of said axle assembly, wherein at least two of said elements are separable at a parting plane generally containing the longitudinal axes of said axle shafts; and differential gearing means supported by said housing drivingly connected between said hydrostatic transmission and said axle shafts.

2. An axle assembly according to claim 1 wherein said hydrostatic transmission includes at least one power transmission shaft and wherein said elements locate said power transmission shafts.

3. An axle assembly according to claim 1 wherein a gear train is internally disposed within said housing.

4. An axle assembly according to claim 1 wherein said hydrostatic transmission includes a pump and a motor mounted to respective sides of a central member.

5. An axle assembly comprising two main housing elements together defining an internal cavity in which a hydraulic hydrostatic transmission is encapsulated, said hydrostatic transmission comprising pintle support means dividing said cavity into first and second chambers; a pintle fixedly and non-rotatably mounted in said pintle support means, said pintle having first and second ends extending into said first and second chambers, respectively, and internal first and second hydraulic fluid passages terminating in ports; a rotary cylinder barrel rotatably mounted on each end of said first and second extending pintle ends, each said barrel comprising a plurality of radially arranged cylinders and a plurality of pistons disposed in said cylinders, said cylinders successively communicating with said ports during rotation of said barrels; an annular cam track surrounding each said barrel, said pistons operatively connected to the respective cam track; first and second rotary shafts, each said rotary shaft being rotatably mounted in one said housing element, respectively, said rotary shafts extending into said first and second chambers, respectively; and means coupling said rotary shafts to said barrels.

6. An axle assembly according to claim 5 wherein the said internal cavity is formed when the said two housing elements are assembled and located together.

7. An axle assembly according to claim 5, wherein said pintle support means is secured between the said two housing elements.

8. An axle assembly according to claim 5, wherein said hydrostatic transmission includes a gear train disposed within the said two housing elements.

9. An axle assembly according to claim 5, including axle shafts rotatably supported in said housing elements and means drivingly connecting one of said first and second rotary shafts to said axle shafts, and where said housing elements are separable at a parting plane generally containing the longitudinal axes of the axle shafts.

10. An axle assembly according to claim 5, wherein the said hydrostatic transmission includes an oil expansion tank disposed within the said two housing elements.

11. An axle assembly comprising two main housing elements encapsulating a separate dished housing supporting a hydraulic hydrostatic transmission, said dished housing serving to segregate a gear compartment of the axle assembly from an oil compartment of the hydrostatic transmission, said hydrostatic transmission comprising pintle support means dividing said oil compartment into first and second chambers; a pintle fixedly and non-rotatably mounted in said pintle support means, said pintle having first and second ends extending into said first and second chambers, respectively, and internal first and second hydraulic fluid passages terminating in ports; a rotary cylinder barrel rotatably mounted on each of said first and second extending pintle ends, each said barrel comprising a plurality of radially arranged cylinders and a plurality of pistons disposed in said cylinders, said cylinders successively communicating with said ports during rotation of said barrels; an annular cam track surrounding each said barrel, said pistons operatively connected to the respective cam track; first and second rotary shafts, said first rotary shaft being rotatably mounted in one housing element, said second rotary shaft being rotatably mounted in said dished housing, said first and second rotary shafts extending into said first and second chambers, respectively; and means coupling said first and second rotary shafts to said barrels.

12. An axle assembly according to claim 11 wherein the said pintle support means is secured between the said dished housing and one of the said main housing elements.

13. An axle assembly comprising two main housing elements of which one defines a recessed chamber in which a hydraulic hydrostatic transmission is located, said hydrostatic transmission comprising pintle support means dividing said recessed chamber into first and second compartments; a pintle fixedly and non-rotatably mounted in said pintle support means, said pintle having first and second ends extending into said first and second compartments, respectively, and internal first and second hydraulic fluid passages terminating in ports; a rotary cylinder barrel rotatably mounted on each of said first and second extending pintle ends, each said barrel comprising a plurality of radially arranged cylinders and a plurality of pistons disposed in said cylinders, said cylinders successively communicating with said ports during rotation of said barrels; an annular cam track surrounding each said barrel, said pistons operatively connected to the respective cam track; an auxiliary housing providing enclosure means to said recessed chamber; a first rotary shaft rotatably mounted in said auxiliary housing, and a second rotary shaft rotatably mounted in one said housing element, said rotary shafts extending into said first and second compartments, respectively; and means coupling said rotary shafts to said barrels.

14. An axle assembly according to claim 13 wherein the said pintle support means is secured between the said auxiliary housing and one of the said main housing elements.

15. An axle according to claim 13 wherein the transmission includes a gear train disposed within the said main housings elements.

16. An axle assembly according to claim 13 including axle shafts rotatably supported in said housing elements and means drivingly connecting one of said first and second rotary shafts to said axle shafts, and where said housing elements are separable at a parting plane generally containing the longitudinal axes of the axle shafts.

17. An axle assembly comprising two housing elements providing two internal chambers in which a hydraulic hydrostatic transmission is encapsulated, said hydrostatic transmission comprising a pintle fixedly and non-rotatably mounted between two said housing elements, said pintle having first and second ends extending into said first and second chambers, respectively, and internal first and second hydraulic fluid passages terminating in ports; a rotary cylinder barrel rotatably mounted on each of said first and second extending pintle ends, each said barrel comprising a plurality of radially arranged cylinders and a plurality of pistons disposed in said cylinders, said cylinders successively communicating with said ports during rotation of said barrels; and annular cam track surrounding each said barrel, said pistons operatively connected to the respective cam track; first and second rotary shafts rotatably mounted between the two housing elements, said rotary shafts extending into said first and second chambers, respectively; and means coupling said rotary shafts to said barrels.

18. An axle assembly according to claim 17 wherein the said two housing elements act to provide a partition wall between the said cylinder barrels, said partition wall being formed as an integral part of the said two housing elements.

19. An axle assembly according to claim 17 wherein the said hydrostatic transmission includes a gear train disposed within the said housing elements, said gear train being located and supported between said housing elements.

20. An axle assembly according to claim 16 including axle shafts rotatably supported in said housing elements and means drivingly connecting one of said first and second rotary shafts to said axle shafts, and where said housing elements are separable at a parting plane generally transverse to the longitudinal axes of the axle shafts.

21. An axle assembly comprising:
a housing including two main housing elements defining an internal cavity;
a hydraulic hydrostatic transmission encapsulated in said cavity, said hydrostatic transmission comprising means dividing said cavity into first and second chambers, a hydrostatic pump in one chamber and a hydrostatic motor operatively coupled to said pump and being disposed in the other chamber;
axle shafts rotatably supported in said housing;
said housing elements being separable at a parting plane generally containing the longitudinal axes of said axle shafts; and
differential gearing means within said housing drivingly connected between said hydrostatic motor and said axle shafts.

22. The axle assembly of claim 21 wherein said dividing means is secured between said main housing elements.

23. The axle assembly of claim 21 wherein said axle shafts are coaxial and said parting plane is generally coincident with the axis of said axle shafts.

24. The axle assembly of claim 22 including a pintle mounted in said dividing means, said pintle having first and second ends extending into said first and second chambers, respectively, and internal first and second hydraulic fluid passages, and wherein said hydrostatic pump and said hydrostatic motor are fluidly connected by means of said passages.

25. The axle assembly of claim 15 wherein said pintle is fixedly and non-rotatably connected to said dividing means, and wherein said hydrostatic pump and motor each comprises a rotary cylinder barrel rotatably mounted on said first and second ends, respectively, of said pintle and including cylinders in fluid communication with said fluid passages as said barrels rotate, said hydrostatic pump and motor including radially oriented pistons in said cylinders.

26. The axle assembly of claim 16 including a vertically oriented input shaft rotatably mounted in one housing element and connected to said hydrostatic pump, and a vertically oriented output shaft rotatably mounted in the other housing element and connected to said hydrostatic motor.

27. The axle assembly of claim 16 wherein said dividing means is secured between said main housing elements.

28. The axle assembly of claim 12 including a vertically oriented input shaft rotatably mounted in one housing element and connected to said hydrostatic pump, and a vertically oriented output shaft rotatably mounted in the other housing element and connected to said hydrostatic motor.

29. The axle assembly of claim 19 wherein said dividing means is secured between said main housing elements.

30. The axle assembly of claim 12 wherein said housing includes a gearing compartment containing said differential gearing, said housing segregating said differential gearing compartment from said internal cavity.

31. The axle assembly of claim 21 wherein said dividing means is secured between said main housing elements.

32. The axle assembly of claim 22 including a pintle mounted in said dividing means, said pintle having first and second ends extending into said first and second chambers, respectively, and internal first and second hydraulic fluid passages, and wherein said hydrostatic pump and said hydrostatic motor are fluidly connected by means of said passages, and including a pair of check valve means in said first and second pintle passages, respectively, both said check valve means being disposed at either or both ends of said pintle.

33. The axle assembly of claim 22 wherein said dividing means comprises an intermediary member between said hydrostatic pump and hydrostatic motor, and a dish element forming a wall of one of said chambers and being in engagement with said intermediary member and at least one of said housing elements.

34. The axle assembly of claim 24 wherein said dividing means is secured between said main housing elements.

35. The axle assembly of claim 25 wherein said axle shafts are coaxial and said main housing elements are connected together along a parting plane that is generally coincident with the axis of said axle shafts.

36. The axle assembly of claim 24 wherein said housing includes a gearing compartment containing said differential gearing, and said dish element segregates said gearing compartment from said hydrostatic transmission cavity.

37. The axle assembly of claim 24 wherein said dish element is connected to an upper ne of said main housing elements.

38. An axle assembly comprising:
a housing including two main housing elements and a hydrostatic transmission cover element, said housing defining a hydrostatic transmission cavity between said cover element and one of said main housing elements and defining a gearing compartment between said main housing elements,
a hydraulic hydrostatic transmission encapsulated in said cavity, said hydrostatic transmission including means dividing said cavity into first and second chambers, a hydrostatic pump disposed in said first chamber and a hydrostatic motor operatively coupled to said pump and being disposed in said second chamber,
coaxial axle shafts rotatably supported in said housing,
said housing elements being separable at a parting plane parallel to the longitudinal axes of said coaxial axle shafts, and
differential gearing means within said housing drivingly connected between said hydrostatic motor and said coaxial axle shafts.

39. The axle assembly of claim 29 including a pintle mounted in said dividing means, said pintle having first and second ends extending into said first and second chamber, respectively, and internal first and second hydraulic fluid passages, and wherein said hydrostatic pump and said hydrostatic motor are fluidly connected by means of said passages.

40. An axle assembly comprising:
a housing including two main housing elements connected together along a parting plane and defining an internal cavity,
a hydrostatic transmission encapsulated in said cavity and including first and second chambers, a hydrostatic pump in one chamber and a hydrostatic motor fluidly coupled to the hydrostatic pump and being disposed in the other chamber, coaxial axle shafts rotatably supported in said housing, said housing elements being separable at said parting plane that is generally parallel to the longitudinal axes of said coaxial axle shafts, and gearing means in said housing drivingly connected between said hydrostatic motor and said coaxial axle shafts.

41. The axle assembly of claim 31 wherein said hydrostatic transmission includes:

means dividing said cavity into said chambers and a fixed pintle mounted in said dividing means, said pintle including internal passages for providing fluid communication between said hydrostatic pump and motor.

42. The axle assembly of claim 32 wherein said hydrostatic pump and motor each includes a cylinder barrel rotatably mounted on opposite ends of said pintle.

43. The axle assembly of claim 33 wherein said dividing means is secured is clamped between said main housing elements.

44. The axle assembly of claim 31 including a gearing compartment in said housing containing said gearing means, said housing including a wall separating said gearing means from said hydrostatic transmission first and second chambers.

45. An axle assembly according to claim 4 wherein said central member forms a component part of said hydrostatic transmission and is held between said separable elements.

46. An axle assembly according to claim 4 wherein said central member is formed as a component part of at least one of said separable elements comprising said housing.

47. An axle assembly according to claim 5, including axle shafts rotatably supported in said housing elements and means drivingly connected one of said first and second rotary shafts to said axle shafts, and where said housing elements are separable at a parting plane generally transverse to the longitudinal axes of the axle shafts.

48. An axle assembly according to claim 11, including axle shafts rotatably supported in said housing elements and means drivingly connecting one of said first and second rotary shafts to said axle shafts, and where said housing elements are separable at a parting plane generally containing the longitudinal axes of the axle shafts.

49. An axle assembly according to claim 11, including axle shafts rotatably supported in said housing elements and means drivingly connecting one of said first and second rotary shafts to said axle shafts, and where said housing elements are separable at a parting plane generally transverse to the longitudinal axes of the axle shafts.

50. An axle assembly according to claim 13, including axle shafts rotatably supported in said housing elements and means drivingly connecting one of said first and second rotary shafts to said axle shafts, and where said housing elements are separable at a parting plane generally transverse to the longitudinal axes of the axle shafts.

51. An axle assembly according to claim 17, including axle shafts rotatably supported in said housing elements and means drivingly connecting one of said first and second rotary shafts to said axle shafts, and where said housing elements are separable at a parting plane generally containing the longitudinal axes of the axle shafts.

52. The axle 1 assembly of claim 12 wherein said housing includes a gearing compartment containing said differential gearing, said housing segregating said differential gearing compartment from said internal cavity.

53. The axle assembly of claim 29 wherein said housing includes a gearing compartment containing said differential gearing, and said housing elements segregates said gearing compartment from said hydrostatic transmission cavity.

54. The axle assembly of claim 32 wherein the said dividing means forms part of said main housing elements.

55. An axle assembly comprising:

a housing including two main housing elements connected together along a parting plane and defining first and second internal cavities separated from each other, a hydrostatic transmission encapsulated in said first cavity, and means dividing said first cavity into first and second chambers, a hydrostatic pump in one chamber and a hydrostatic motor fluidly coupled to the hydrostatic pump and being disposed in the other chamber, axle shafts rotatably supported in said housing, and gearing means located in said second cavity and drivingly connected between said hydrostatic motor and said axle shafts.

56. The axle assembly of claim 46 wherein said main housing elements are separable at a plane generally parallel to the longitudinal axes of the axle shafts.

57. The axle of assembly of claim 46 wherein said main housing elements are separable at a plane generally containing the longitudinal axes of the axle shafts.

58. An axle assembly of claim 46 wherein said housing includes a wall separating said second cavity from said hydrostatic transmission first and second chambers.

59. An axle assembly of claim 49 wherein said wall acts to prevent hydraulic fluid contained within said first and second chambers of said hydrostatic transmission from entering said second cavity containing said gearing means.

60. An axle assemble comprising:

a housing including two main housing elements connected together along a parting plane and defining at least two internal cavities, a hydrostatic transmission, comprising a hydrostatic pump and a hydrostatic motor, at least partly disposed in one or more cavities;

gearing means disposed in at least one other cavity; said gearing means drivingly connecting said hydrostatic motor to axle shafts, and said cavities associated with said hydrostatic transmission and said cavities associated with said gearing means of the axle shafts being segregated.

61. The axle assembly of claim 51 wherein said axle shafts are rotatably supported in said housing, and said main housing elements are separable at a plane generally transverse to the longitudinal axes of the shafts.

62. The axle assembly of claim 51 wherein said axle shafts are rotatably supported in said housing, and said main housing elements are separable at a plane generally containing the longitudinal axes of the axle shafts.

63. An axle assembly according to claim 3 wherein said gear train and said hydrostatic transmission are supported and positioned in pockets that are formed between said separable elements of said housing, and wherein said separable elements form partition means between said gear train and said hydrostatic transmission.

64. An axle assembly comprising a housing having a first cavity for an internally disposed hydrostatic transmission, said first cavity forming an integral part of said hydrostatic transmission; axle shafts rotatably supported in said housing; said housing being defined by at least two separable elements of said axle, wherein at least two of said elements are separable at a parting plane generally transverse to the longitudinal axes of said axle shafts; and differential gearing means within a second cavity of and supported by said housing drivingly connected between said hydrostatic transmission and said axle shafts, said first and second cavities being segregated from each other.

65. An axle assembly according to claim 64 wherein a gear train is internally disposed within said housing.

66. An axle assembly according to claim 65 wherein said gear train and said hydrostatic transmission are supported and positioned in pockets that are formed between said separable elements of said housing, and where said separable elements form partition means between said gear train and said hydrostatic transmission.

* * * * *

UNITED STATES PATENT AND TRADEMARK OFFICE
CERTIFICATE OF CORRECTION

PATENT NO. : 4,979,583

DATED : December 25, 1990

INVENTOR(S) : Christian Helmut THOMA et al.

It is certified that error appears in the above—identified patent and that said Letters Patent is hereby corrected as shown below:

On the cover sheet, insert an Item 73 as follows:
--[73] Assignee: Unipat AG, Glarus, Switzerland; and Tecumseh Products Company, Tecumseh, Michigan; part interest--

On the list of References Cited, under the heading "Foreign Patent Documents", insert the following:
--1,159,280  6/1964  West Germany--

```
Column 5, line 19, change "produced" to --produces--.
Column 10, line 66, (claim 20), change "16" to --17--.
Column 11, line 33, (claim 25), change "15" to --24--;
          line 42, (claim 26), change "16" to --25--;
          line 48, (claim 27), change "16" to --26--;
          line 51, (claim 28), change "12" to --21--;
          line 57, (claim 29), change "19" to --28--;
          line 60, (claim 30), change "12" to --21--;
          line 64, (claim 31), change "21" to --30--.
Column 12, line 15, (claim 34), change "24" to --33--;
          line 18, (claim 35), change "25" to --34--;
          line 22, (claim 36), change "24" to --33--;
          line 27, (claim 37), change "24" to --33--;
          line 28, (claim 37), change "ne" to --one--;
          line 53, (claim 39), change "29" to --38--.
Column 13, line 9, (claim 41), change "31" to --40--;
          line 16, (claim 42), change "32" to --41--;
          line 19, (claim 43), change "33" to --42--;
          line 20, (claim 43), delete "is clamped";
          line 22, (claim 44), change "31" to --40--;
          line 65, (claim 52), change "axle 1 assembly of
claim 12" to --axle assembly of claim 21--.
```

UNITED STATES PATENT AND TRADEMARK OFFICE
CERTIFICATE OF CORRECTION

PATENT NO. : 4,979,583            Page 2 of 2
DATED : December 25, 1990
INVENTOR(S) : Christian Helmut THOMA et al.

It is certified that error appears in the above—identified patent and that said Letters Patent is hereby corrected as shown below:

```
Column 14, line  1, (claim 53), change "29" to --38--;
           line  6, (claim 54), change "32" to --41--;
           line 24, (claim 56), change "46" to --55--;
           line 27, (claim 57), change "46" to --55--;
           line 30, (claim 58), change "46" to --55--;
           line 33, (claim 59), change "49" to --58--;
           line 51, (claim 61), change "51" to --60--;
           line 55, (claim 62), change "51" to --60--.
```

Signed and Sealed this

Thirteenth Day of October, 1992

*Attest:*

DOUGLAS B. COMER

*Attesting Officer*      *Acting Commissioner of Patents and Trademarks*